Sept. 8, 1936.  J. F. McCANN ET AL  2,054,023
DRIVING MECHANISM
Filed Feb. 19, 1935
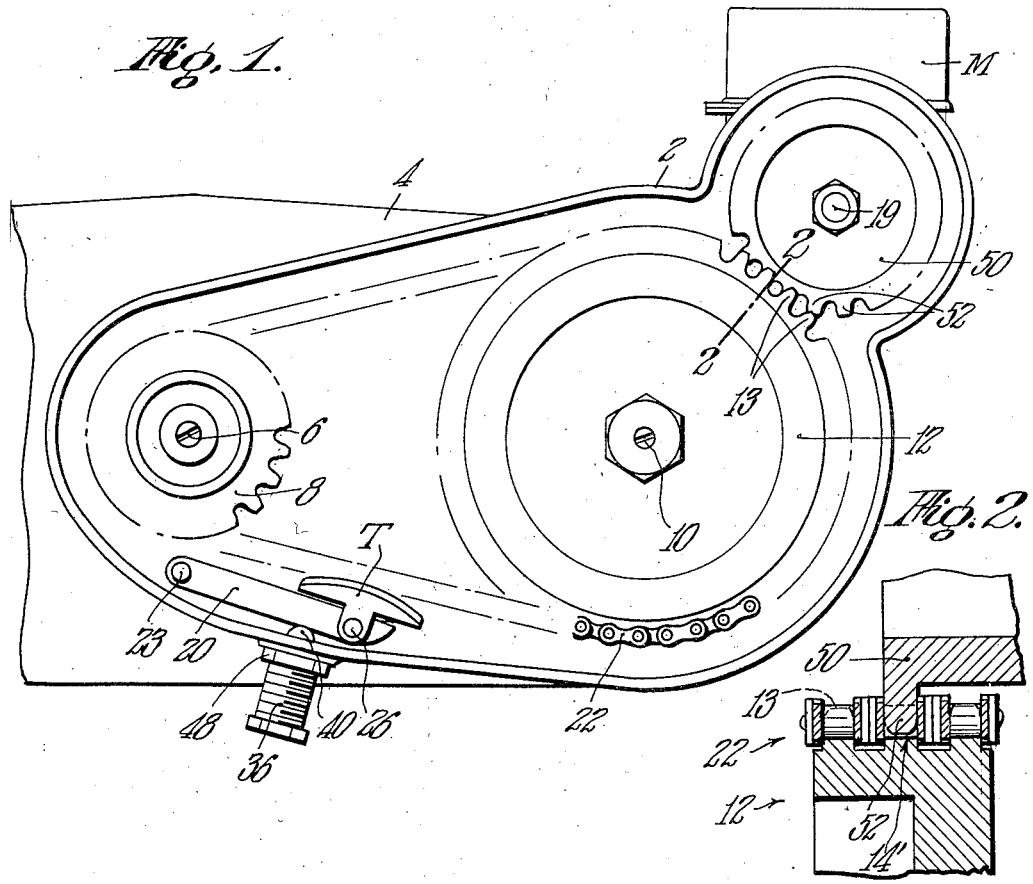
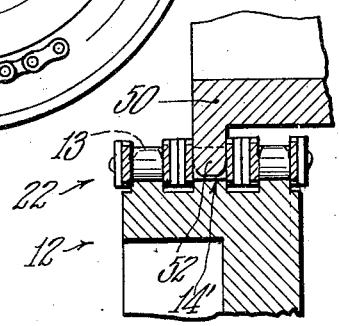
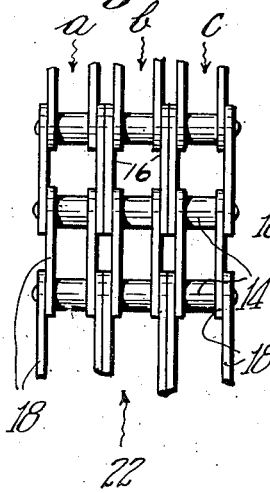
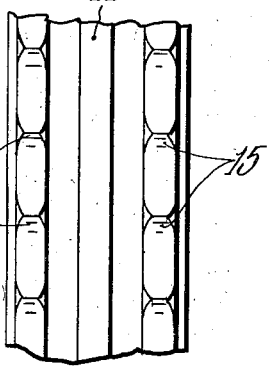
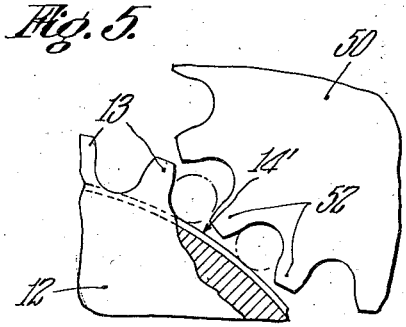
INVENTOR.
John F. McCann and
BY Carl H. Johnson
Walter C. Ross
ATTORNEY.

Patented Sept. 8, 1936

2,054,023

UNITED STATES PATENT OFFICE 2,054,023

DRIVING MECHANISM

John F. McCann and Carl E. Johnson, Springfield, Mass., assignors to Baldwin-Duckworth Chain Corporation, Springfield, Mass., a corporation of Massachusetts Application February 19, 1935, Serial No. 7,203

3 Claims. (Cl. 74—221)

This invention relates to improvements in driving mechanism and is directed more particularly to improvements in chain-drive apparatus particularly adapted for motorcycles and the like.

This application is a refile in part of abandoned application No. 707,238 filed on January 19, 1934.

According to one novel feature of the invention, a chain-drive apparatus is provided wherein an endless chain passing over driving and driven elements is utilized in a novel way for driving another unit such as a magneto. In this way, the invention obviates the necessity of independent or separate driving connections for the said other unit.

In its broad aspects the invention has for its object the driving of such a unit as a magneto from what may be called the primary drive. As is hereinafter explained, the magneto of a motorcycle or the like is driven direct from a so-called primary drive in such a way as to obviate the necessity of chains and sprockets or gears between the magneto and some one of the elements of the primary drive. In this way not only is economy in manufacture facilitated but compactness results which is always desirable in connection with motorcycles and as will hereinafter appear, smoothness and efficiency of operation is attained without the wear and tear of parts incident to present-day structures.

Numerous novel features and advantages of the invention will be more fully hereinafter referred to in connection with the accompanying description of the present preferred form of the invention and reference will be had to the accompanying drawing wherein:

Fig. 1 is an elevational view showing the novel features of the invention associated with certain parts common to a motorcycle;

Fig. 2 is a sectional view on the line 2—2 of Fig. 1;

Fig. 3 is a partial edge view of a sprocket forming a part of the invention;

Fig. 4 is a fragmentary plan view of one form of chain adapted for the practice of the invention; and Fig. 5 is an enlarged sectional elevational view to explain certain features of the invention.

Referring now to the drawing more in detail the invention will be fully described.

As previously mentioned the novel features of the invention are particularly adapted for use with a motorcycle, but it will be understood that the following disclosure is merely for purposes of description.

In Fig. 1 there is represented at 2 a housing or casing which is usually disposed at the forward side of a motorcycle engine. 4 represents an engine base and 6 is a crank shaft, which may be called the primary driving element. A toothed drive member 8 in the form of a sprocket is suitably associated with the drive shaft 6.

At 10 is represented a driven element which, in this case, may be the in-put shaft of a transmission of a motorcycle from which the rear or driving wheel of the motorcycle is driven. A second toothed driven member in the form of a sprocket 12 is associated with the shaft 10 and this is operatively connected to and driven from the sprocket 8 by an endless chain indicated generally by 22.

The chain 22 will preferably be of the multiple-strand type wherein separate strands or rows, a, b, and c, of tooth-engaging elements, such as bushings or rollers 14, are provided and which are associated with intermediate links or plates 16 between the bushings or rollers and outer links or plates 18.

At least one of the sprockets such as 12 is provided with sets or circumferential spaced rows of teeth. The teeth 13 form one row and the teeth 15 form the other row. Each one of the rows of teeth coacts with the bushings or rollers of one of the strands or rows of the chain. Of course, there may be as many strands or rows of bushings or rollers in the chain and as many sets or rows of teeth on the sprockets as may be desired. This will depend more or less upon the purpose for which the drive is to be employed.

In the form of the invention shown the chain has a central, or intermediate, and two outer rows of driving elements, while the sprocket has two rather widely spaced rows of teeth engageable with the outer rows of driving elements. In the space between the rows of teeth of sprocket 12 there is a peripheral ridge or rim 14' as shown in Fig. 3. This is for a purpose later to be described.

As is well-known, in the normal operation of a chain-drive of the type shown and described, the chain tends to elongate and become slack due to wear of its component parts. This, of course, results in unsatisfactory operation and is objectionable. As in United States Letters Patent No. 1,988,421 novel means is preferably provided to automatically tighten, or take up slack in, the chain. This means may include a lever or arm 20 which is pivoted as on a pin 23 suitably associated with the casing or support 2.

A chain-engaging member T, which may be called a shoe, is movable on the arm 20 as on a pin 26. The upper face or chain-engaging part of the shoe is preferably curved, as shown, and is provided with alternate grooves and ridges so that with a multiple-strand chain, such as shown in Fig. 4, the intermediate links thereof pass through the grooves of the shoe while the bushings or rollers of the chain ride on the said rims.

Associated with the shoe T and part 2 there is means for adjusting and maintaining the same in desired positions. This may include an adjuster 36 which is bored out to slidably receive a plug such as 40 that is provided with a suitably shaped upper end for bearing on the underside of members 20. A spring may be provided within the bore of part 36 to urge the plug member 40 upwardly. The adjuster 36 may be moved up and down for adjusting purposes and a lock nut or nuts 48 are provided to lock the adjuster in its adjusted positions.

The parts of the tightener are so constructed and arranged that the shoe T yieldingly bears on the outer or back side of the driving elements of the chain to take up slack therein and cause it to properly hug the sprockets such as 12. Since, as stated, the upper face of the shoe is preferably curved, it causes the chain to travel in the curved path between the sprockets that it would normally assume when operating in a slack condition. Instead of acting on the chain in a direction opposed to the direction which it would naturally take, a slack-removing tension may be exerted thereagainst. This is without undue pressure and the consequent friction and wear so that the chain merely slides or rides on the shoe. The shoe is yieldable on the arm and the arm itself is yieldable, whereby the tightening function is accomplished by yielding pressure.

Not only therefore does the tightener mechanism function for its desired purpose but the chain in engagement with sprocket 12 is held in what may be called a tightly wrapped relation thereon.

According to the novel features of this invention another element or unit is driven directly by the driving mechanism described. In the drawing M represents a magneto which is ordinarily driven from shaft 10 by chain and sprocket connections. As distinguished therefrom the magneto is driven directly. To accomplish this, one row of teeth of the sprocket 12, as for instance, an intermediate row of teeth, is omitted so that there are one or more sets or rows of teeth 13 and 15 at either side of what may be termed a circumferential slot or space.

A driven element 50 which represents the sprocket of the magneto M, generator or the like, is disposed so that the sprocket teeth 52 are disposed between the rows of teeth 13 and 15 of the sprocket 12. The pitch line of the sprockets 12 and 50 may coincide with the teeth of one sprocket passing by those of the other.

The outer strands or rows of driving elements 14 of the chain engage the outer rows of the teeth 13 and 15 of the sprocket 12 while the intermediate row or strand of elements overlie the ridge 14' of sprocket 12 and engage the teeth 52 of the driven sprocket 50.

As shown in Fig. 5 the intermediate row b of driving elements of the chain bear on the ridge or rim 14' of sprocket 12 or they are supported thereby. The outer rows of the chain elements are seated in the tooth spaces between the teeth of the sprocket 12 while the intermediate row of elements of the chain supported by the part 14' of the sprocket 12 are received in and seated in the spaces between the teeth 52 of the sprocket 50. The addendum of the teeth 52 of sprocket 50 are preferably less than standard so that they clear the part 14' of the sprocket 12.

In this way the center to center distance of the sprockets 12 and 50 may be accurately fixed relative to one another while the outer and central rows of driving elements are well seated in their respective sprockets. The intermediate or central row of driving elements of the chain serve to drive sprocket 50 and since these are supported by the supporting part of sprocket 12 there are no undue stresses and strains exerted on the central row of elements and their associated parts. The chain being held in snugly wrapped relation on sprocket 12 there is no undue vibration, play and flexing of the chain parts so that sprocket 50 is positively driven.

The novel construction makes it possible not only to maintain the center to center distance of the magneto and shaft 10 at a minimum so as to make for compactness but the number of parts is reduced to facilitate economy in manufacture while in operation the novel drive is positive and rugged and is so constructed as to obviate vibrations and noise.

Thus, as will be seen, the sprocket 12 is not only driven by means of the chain from the sprocket 8 but the said chain is utilized to drive the sprocket 50 which is as shown on a fixed axis to enhance the desired smooth quiet operation. The necessity of other connections such as gears, sprockets, chains, and the like between either the shaft 10 or 6 and the shaft 19 of the magneto or other unit is rendered unnecessary. By this means the additional unit is efficiently driven in a simple and efficient manner while the entire structure may be compact, simple in form and positive in its operation without the present lost motion, vibration, noise, undue wear and other objections of the prior art mechanisms of this type.

It will be appreciated that the chain may be of the roller or bushing type and that it may consist of as many strands or rows of driving elements as may be desired.

It is desired to point out that in practice it is desired to accurately form the teeth of the sprockets so that the outer rows of elements are properly received between the teeth of sprocket 12 while the intermediate row of elements are likewise received between the teeth of sprocket 50 while at the same time the intermediate elements are suitably supported not only to obviate undue flexing and wear of the chain parts but to insure a quiet, efficient and compact drive.

By providing the means on sprocket 12 for supporting the central row of chain elements the center to center distance of the sprockets 12 and 50 may be fixed so that the elements of the chain are snugly seated in their respective spaces between the sprocket teeth thereby to eliminate undue stresses and strains and consequent wear and noise in operation.

While we have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. Driving mechanism for motorcycles and the like comprising in combination, a pair of sprockets rotatable on fixed axes, one of said sprockets having separate spaced rows of alternate teeth and sockets, and a peripheral rim between said rows of teeth, a chain extending around and including said sprockets having link-connected outer and inner rows of driving elements, the elements of the outer rows engaging the teeth of said one sprocket with the inner row bearing on said rim, a driven sprocket outside said chain on a fixed axis and adjacent said one sprocket having alternate teeth and sockets, the said teeth engaging the inner row of elements of the chain and the said sockets receiving said elements whereby there are elements between said one sprocket and driven sprocket which are engaged on opposite sides by said rim and sockets of the driven sprocket.

2. The combination in a motorcycle of a chain and sprocket drive and driven unit such as a magneto or the like with means for driving the latter from the former comprising, one sprocket having separate rows of teeth at opposite sides of a circumferential space, the said chain having intermediate and outer rows of driving elements connected together by links with the outer rows engageable with the teeth of said one sprocket and the intermediate row disposed in the space between the said rows of teeth, a driven sprocket on said unit having teeth engaging the intermediate row of driving elements of the chain with the axes of said one sprocket and unit relatively fixed, and a peripheral supporting rim associated with said one sprocket disposed in the space between the rows of teeth thereof supporting the intermediate driving elements of said chain.

3. Driving mechanism for motorcycles comprising in combination, a pair of toothed sprockets, a chain extending therearound having central and outer rows of spaced driving elements connected by links, one of said sprockets having spaced circumferential rows of teeth and spaces engaging the outer rows of driving elements of the chain, and a driven sprocket having teeth and spaces therebetween receiving the central row of driving elements of said one sprocket whereby it is driven therefrom, the said first one sprocket between the rows of teeth thereof having a circumferential part supporting the central row of elements of the chain which are engaged by the said driven sprocket.

JOHN F. McCANN.
CARL E. JOHNSON.